United States Patent [19]

Weidner

[11] 3,713,894
[45] Jan. 30, 1973

[54] DISPOSABLE RESERVE ACTIVATED ELECTROCHEMICAL CELL

[75] Inventor: Evert C. Weidner, Philadelphia, Pa.
[73] Assignee: Honeywell Inc., Minneapolis, Minn.
[22] Filed: Aug. 30, 1971
[21] Appl. No.: 175,825

[52] U.S. Cl....................................136/113, 136/90
[51] Int. Cl..............................................H01m 21/00
[58] Field of Search....................136/112–114, 90, 136/160, 162–163; 137/260; 141/302; 222/389

[56] References Cited

UNITED STATES PATENTS

| 3,343,993 | 9/1967 | Andersson | 136/90 |
| 3,480,480 | 11/1969 | Merz et al. | 136/90 |
| 3,481,791 | 12/1969 | Orsino | 136/113 |
| 2,118,996 | 5/1938 | Winckler | 136/113 |

Primary Examiner—Anthony Skapars
Attorney—Charles J. Ungemach et al.

[57] ABSTRACT

A disposable reserve activated electrochemical cell wherein the active elements of the cell, including electrolyte solvent, are maintained in a separate first flexible plastic envelope and the entire cell, including the first envelope, are contained within a second flexible plastic envelope. Both the first and the second envelope are contained within a relatively rigid housing. The activation of the cell is achieved by perforating the first envelope, without breaking the seal of the second envelope, thereby maintaining a good hermetic seal and preventing leakage.

5 Claims, 3 Drawing Figures

PATENTED JAN 30 1973    3,713,894

E.C. WEIDNER
INVENTOR.

BY *Altin Medney*
ATTORNEY

DISPOSABLE RESERVE ACTIVATED ELECTROCHEMICAL CELL

BACKGROUND OF THE INVENTION

1. Field of the Invention

The present invention relates to reserve activated primary electric current-producing cells. More particularly, the invention relates to the type of cells wherein a liquid electrolyte solvent, by itself or in combination with other active elements, is utilized and is confined prior to activation in a manner to prevent its simultaneous contact with the cell anode and the cell cathode.

2. Description of the Prior Art

Prior art is replete with designs for reserve activation of electrochemical cells. Most of the prior art designs, however, are relatively expensive to construct. Others, less expensive to make, have shortcomings, such as leakage and short shelf life, which the present invention eliminates.

An example of such prior art devices is described in U.S. Pat. No. 2,118,996, wherein an emergency lamp is shown with reserve activation capability. The electrolyte is maintained in a spherical glass ampule which may be broken when activation is desired. Another example of prior art is U.S. Pat. No. 3,343,993, also relating to a deferred action cell in which the electrolyte is maintained in a separate compartment prior to activation. Means are provided for transferring the electrolyte from the electrolyte compartment to the cell compartment for activation.

SUMMARY OF THE INVENTION

A reserve activated primary electric current-producing cell according to the present invention will find use wherever reserve power may be needed after long periods of inactive life. For example, it could find use in the area of civil defense or in emergency kits for automobiles, boats, camping equipment of the like.

The improvement of the present invention over prior art lies in the double envelope structure which provides a secure hermetic seal with easy and inexpensive construction. The outside housing of a cell according to the present invention is in the form of an elongated rigid plastic cylinder. The housing has an open slot at one (rearward) end and a pair of electrical conductors extending through the housing at the other (forward) end. Located centrally along the axis within this housing is a first flexible plastic envelope containing active electrochemical material. This first envelope is sealed to maintain its contents out of contact with all other components within the housing. The other components within the housing include an anode, a suitable separator surrounding the anode, and a cathode collector. All of these other components, as well as the first flexible envelope with its contents, are contained within a second elongated flexible plastic envelope having one open end. The open end of the second envelope is mounted within the housing against the forward end in such a way that the electrical conductors extend into the second envelope for connection to the anode and the cathode collector. The seal between the open end of the envelope and the housing is hermetic. The second plastic envelope is substantially longer than the housing and is folded up in a telescoping manner to conform with the housing dimensions. The end of the second envelope opposite to its open end extends partially through the slot in the outside housing os that it can be grasped between two fingers and pulled outwardly for some distance without breaking the seal. Internally to the second envelope, one end of the first envelope is attached to the second envelope at the end opposite to the open end and extending outwardly through the slot in he housing and through this attachment, the second envelope is hermetically sealed. In this way, a pulling action on the first envelope will result in pulling of the second envelope with it. Pulling of the second envelope results in the motion of the first envelope through the slot, causing it to be perforated by the internal frame. At the same time, the seal of the second envelope remains undisturbed since, due to the extended length of the second envelope, it results in only unfolding of the telescoped section. Leakage of the cell contents through the open slot is thereby prevented.

The two electrical conductors extending through the end of the housing opposite to the open slot are connected internally to the cathode collector and the anode, respectively. Externally they are connected to an electric light bulb or other electric current-operated device.

The design of the present invention is ideally suited to allow simple step-by-step assembly in an automated production facility.

It is therefore an object of the present invention to provide an improved and relatively inexpensive reserve activated electric current-producing cell.

A further object of the present invention is to provide a disposable reserve flashlight.

These and further objects will become apparent to those skilled in the art upon consideration of the following specification, claims, and drawing.

DESCRIPTION OF THE PREFERRED EMBODIMENT

Figure 1:
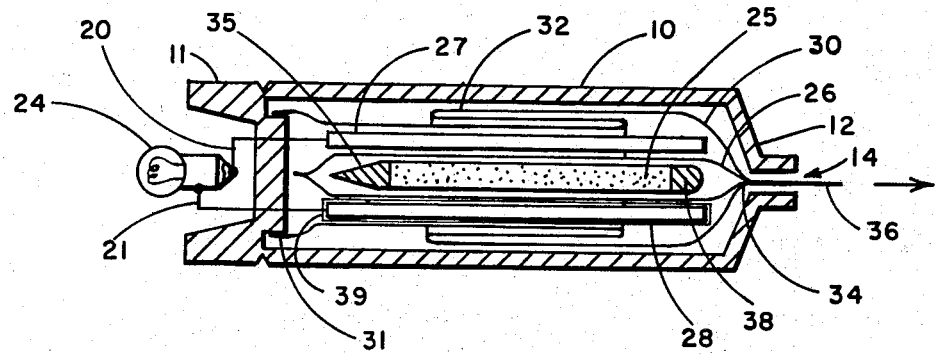
FIG. 1 illustrates a preferred embodiment of a reserve activated cell according to the present invention prior to activation.

Referring now to FIG. 1, a disposable reserve flashlight is illustrated having an external housing 10 constructed of relatively rigid plastic material. For convenience, the housing has an elongated cylindrical shape, but this is only choice of design. Housing 10 has a forward end 11, through which a pair of electrical conductors 20 and 21 extend, passing from the outside to the inside of housing 10. Housing 10 has a second rear end 12 provided with an open slot 14. The length of slot 14 extends across substantially the entire cross section of end 12 and is of sufficient width to allow passage of several thicknesses of polyethylene film. At forward end 11 of housing 10, conductors 20 and 21 are connected externally to an electric light bulb 24.

Within housing 10, a quantity of active cathode material together with an electrolyte solution identified as 25, is contained within a flexible plastic envelope 26. Envelope 26 is, in the preferred embodiment, constructed of polyethylene or other heat sealable film. Its dimensions are roughly in conformance with the cross sectional longitudinal internal dimensions of housing 10. Also within housing 10, on one side of envelope 26, is positioned a cathode collector 27. Cathode collector 27 is of rectangular flat shape essentially equal in size to envelope 26 and may be constructed of an expanded or perforated sheet of nickel or other conductive material compatible with the particular electrochemistry of the system. On the other side of envelope 26, within housing 10, is positioned an anode 28 enclosed within a sleeve of separator material 39 approximately equal in dimensions to cathode collector 27 and envelope 26. The anode may be constructed of thin magnesium sheet or other anode suitable material. In the preferred embodiment, the anode is sandwiched between two layers of heat sealable porous separator material. Anode 28 is connected to the internal end of conductor 21, while cathode collector 27 is connected to the internal end of conductor 20.

The entire assembly, including anode 28, envelope 26 and its contents, and cathode collector 27 are enclosed within a second envelope 30 having an open end. Envelope 30 has its open end attached internally to forward end 11 of housing 10, forming a hermetic seal at 31. In the preferred embodiment shown, envelope 30, when extended, has a longitudinal dimension equal to approximately twice the length of housing 10. To fit within housing 10, envelope 30 is folded in a telescoping fashion (as shown at 32) around the cell elements with the end of envelope 30 nearest rear end 12 of housing 10 protruding partially outwardly through slot 14. The outward protrusion of envelope 30 is identified by numeral 36. The outward protrusion 36 through slot 14 is of sufficient length to provide a convenient surface for grasping and pulling envelope 30 outwardly. The end of envelope 26 nearest rear end 12 of housing 10 is attached firmly (heat sealed) to the internal surface of envelope 30 at 34, fusing the four layers together. At the other end of envelope 26 is mounted a perforating point 35, designed to engage envelope 26 and cause it to rupture when relative motion is produced. Perforating point 35 is part of a frame 38 of sufficient thickness and rigidity not to be able to pass through slot 14.

Figure 2:
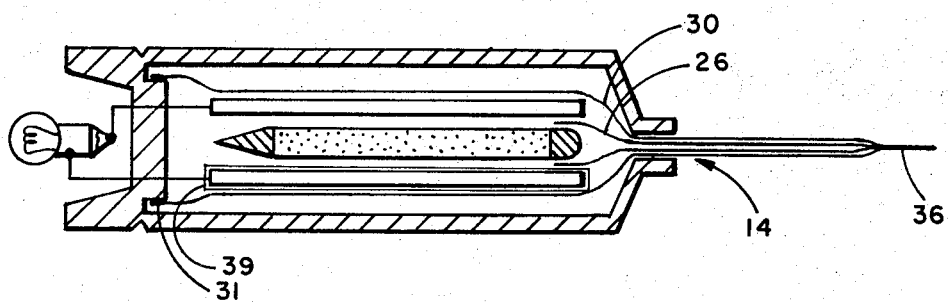
FIG. 2 illustrates the preferred embodiment of the invention of FIG. 1 after activation.

Activation of the cell is achieved by pulling outward protrusion 36 of envelope 30 through slot 14. This pulling action results in motion of envelope 26 past perforating point 35, resulting in rupture of envelope 36. By pulling envelope 30 outwardly to its full extension, the walls of envelope 26 are removed from the area between the cell active material 25 and the anode on one side, and material 25 and cathode collector on the other side. The cell elements are brought into electrochemical contact through the action of the electrolyte which is released from envelope 26 and allowed to freely flow between the cell elements. To prevent escape of the contents of envelope 26 through slot 14 with the motion of envelope 26, a rigid stop member (frame) 38 is interposed between active material 25 and the end of envelope 26 nearest slot 14. Stop member 38 has dimensions exceeding the slot opening and is shaped to allow envelopes 26 and 30 to slide around it as they are pulled through slot 14. A cell in its activated state is illustrated in FIG. 2.

Figure 3:
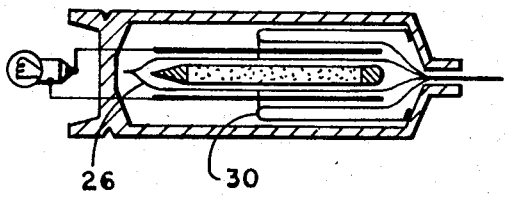
FIG. 3 illustrates an alternate embodiment of the present invention.

The primary function of envelope 30 is to prevent leakage of fluids through slot 14 after envelope 26 is perforated. Thus, the design of envelope 30 can vary considerably without departing from the concept of the present invention. For example, the open end of envelope 30 could be attached to the rear inside end of housing 10, as shown in FIG. 3, assuming that housing 10 is itself constructed of material capable of maintaining a hermetic seal. In such case, envelope 30 would need be only about half as long as that shown in the embodiment of FIG. 1.

In an embodiment, successfully demonstrating the feasibility of the present invention, the following composition was employed. The anode was constructed of magnesium, the cathode collector comprised of an expanded nickel screen, a paper separator was wrapped around the anode, the cathode composition comprised of 68.4 percent manganese dioxide and 31.6 percent carbon mix, and the electrolyte comprised a solution of lithium chloride in water. The overall dimensions of the cell were ¾ inch by ¾ inch by 4 inches. Upon activation, the cell demonstrated a useful output life of 15 to 20 minutes.

An extended shelf life for the cell of the present invention is guaranteed by separation within bag 26 of the electrolyte solution or a combination of the cathode material and the electrolyte. Leakage of the cell chemicals is prevented after activation by the second envelope.

Clearly, modifications and alterations can be made to the design of the disclosed invention without departing from the spirit of the invention. For example, further reduction of unit cost can be achieved by enclosing two or more reserve cells within a single housing, connected in parallel. The cells could then be activated consecutively with or without storage interval.

I claim:

1. A reserve activated primary cell comprising:
 a housing having an open slot at one end;
 a first flexible hermetically sealed envelope positioned within said housing;
 active electrochemical material contained within said first envelope;
 a second flexible hermetically sealed envelope positioned within said housing and containing said first envelope;
 said second envelope further containing elements of electric current-producing cells which together with the electrochemically active material contained within said first envelope constitute a complete electric current-producing cell;
 means extending through said open slot, attached to said second envelope for pulling said second envelope; and
 means for perforating said first envelope in response to the pulling of said second envelope without breaking the seal of said second envelope.

2. A reserve activated primary cell comprising:
 a substantially rigid outside housing having an opening therein;
 cell components positioned within said housing;
 a first hermetically sealed flexible envelope surrounding one or more of said cell components, keeping them out of electrochemical contact with other cell components, thereby rendering the cell inactive;

a second flexible envelope of non-porous material positioned within said housing and enclosing said first envelope and said cell components, said second envelope having a first end attached to the internal wall of said housing to form a seal between said cell components and said opening in said housing, and having a second end protruding through said opening, said second envelope further being of sufficient length so that it may be pulled through said opening for a given distance without breaking said seal;

said first envelope being attached to said second envelope such that a pulling action on said second envelope through said opening results in pulling along of said first envelope; and means mounted within said housing for engaging and perforating said second envelope when said first envelope is moved relative thereto.

3. A reserve activated primary cell according to claim 2 wherein said first and said second envelopes are constructed of heat sealable film.

4. A reserve activated primary cell according to claim 3 wherein said heat sealable film is polyethylene.

5. A reserve activated primary cell according to claim 2 wherein said second envelope is folded in a telescoping manner prior to being pulled through said opening in said housing.

* * * * *